United States Patent [19]

Figone

[11] Patent Number: 4,706,597

[45] Date of Patent: Nov. 17, 1987

[54] SEAMLESS FOLDABLE BOAT

[76] Inventor: Frank M. Figone, 2 Peabody Terrace, #701, Cambridge, Mass. 02138

[21] Appl. No.: 816,224

[22] Filed: Jan. 6, 1986

[51] Int. Cl.⁴ .............................................. B24C 24/00
[52] U.S. Cl. .................................... 114/353; 114/352; 114/354; 114/357
[58] Field of Search ................ 114/343, 357, 352–354, 114/364, 267, 28–30; 441/125; 446/160

[56] References Cited

U.S. PATENT DOCUMENTS

| | | | |
|---|---|---|---|
| 2,880,429 | 4/1959 | Henry | 114/353 |
| 4,032,689 | 6/1977 | Joanson | 114/357 |
| 4,225,551 | 9/1980 | Gault | 114/353 |
| 4,489,476 | 12/1984 | Pvaherty | 114/353 |

Primary Examiner—Joseph F. Peters, Jr.
Assistant Examiner—Clifford T. Bartz
Attorney, Agent, or Firm—Flehr, Hohbach, Test, Albritton & Herbert

[57] ABSTRACT

A foldable boat is made with a seamless low stress hull that is formed from a one piece mold. The boat is assembled with membranes at the bow, stern and sides to seal the boat from water and to enable easy folding. The bow and stern membranes also serve to keep the sides from folding out. A hinged bottom and a hinged side-to-bottom section afford ease of folding and provide substantial resistance to bending after assembly of the boat. Bow and stern boards, side boards and seat boards provide rigidity, reduced slack and act as supports for the boat sections. The boat includes a railing that is locked to the sides and side boards so that migration of the side boards is prevented.

21 Claims, 43 Drawing Figures

FIG_1

FIG_2

FIG_3  FIG_4  FIG_5  FIG_6

FIG_7  FIG_8  FIG_9

FIG_10

FIG_11

FIG_12

FIG_13

FIG_14

FIG_15

FIG_16

FIG_17

FIG_18

FIG_19

FIG_20

FIG_21

FIG_22

FIG_23

FIG_24

FIG_25

FIG_26

FIG_27

FIG_28

FIG_29

FIG_30

FIG_31

FIG_32

FIG_33

FIG_34

FIG_35

FIG_43

FIG_36

FIG_37

FIG_38

*FIG_39*

*FIG_40*

*FIG_41*

*FIG_42*

SEAMLESS FOLDABLE BOAT

DESCRIPTION

1. Technical Field

This invention relates to a seamless foldable boat and in particular to a boat formed from a single piece hull that is easy to assemble and disassemble.

2. Background

Foldable and inflatable boats have been used for several functions, such as fishing, exploration and yacht tenders by way of example. However, it is known that foldable, collapsible or inflatable boats experience major difficulties as a result of the types of construction that are presently followed. For example, inflatable boats require time to inflate and deflate, have seams that weaken with age and result in leakage, are prone to puncture and lack the desired rigidity. With respect to framed foldable boats, assembly is complicated and time consuming due to the large number of parts needed to assemble and construct the boat. The framed foldable boats are restricted in capacity, and do not have the desired rigidity because there is a trade-off between weight and the stiffness of the frame. Also, these boats have seams that weaken with age and tend to leak after usage. Similarly, unframed foldable boats require a large number of parts which makes assembly complicated and time consuming. These unframed boats generally use one thickness throughout the boat and thus compromise ease of folding and operational rigidity. The unframed boats have seams which weaken with age and result in leakage, have a limited life due to the high stresses at the folding points, and are cumbersome to store. These unframed boats lack side flare due to the flat sheet construction methods.

SUMMARY OF THE INVENTION

In accordance with this invention, a seamless foldable boat is formed from a single piece hull which is assembled with a multiplicity of membranes that seal the boat from leakage and yet enables easy folding. The bow and stern membranes serve to keep the sides from folding out. The boat includes a hinged bottom and a hinged side-to-bottom section to allow easy folding, and to provide substantial resistance to bending after assembly of the boat. A number of boards are included to provide rigidity, reduce slack and act as supports. A railing that is locked to the boat sides and side boards maintains the side boards in position

BRIEF DESCRIPTION OF THE DRAWINGS

The invention will be described in detail with reference to the drawings in which.

DESCRIPTION OF THE PREFERRED EMBODIMENT

Figure 1:
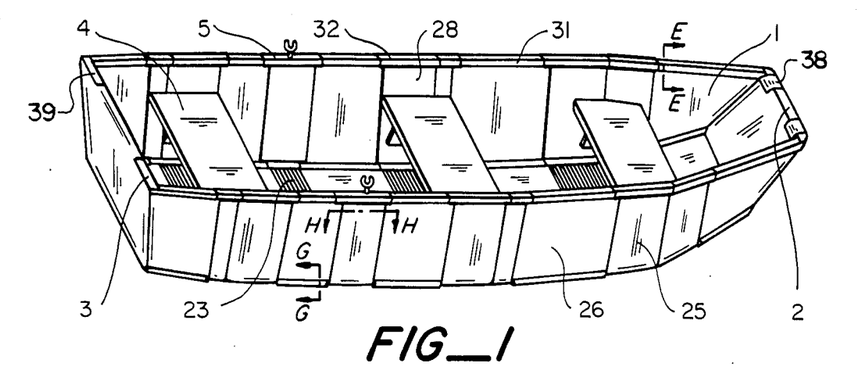
FIG. 1 is a perspective view of a fully assembled seamless foldable boat, in accordance with this invention.

With reference to FIG. 1, an assembled seamless foldable boat is illustrated which is constructed with eight subassemblies in its preferred form. The subassemblies comprise a one piece hull 1, a bow board 2, a stern board 3, three spaced seats 4, and two oarlock boards 5 located at the sides of the boat.

Figure 2:
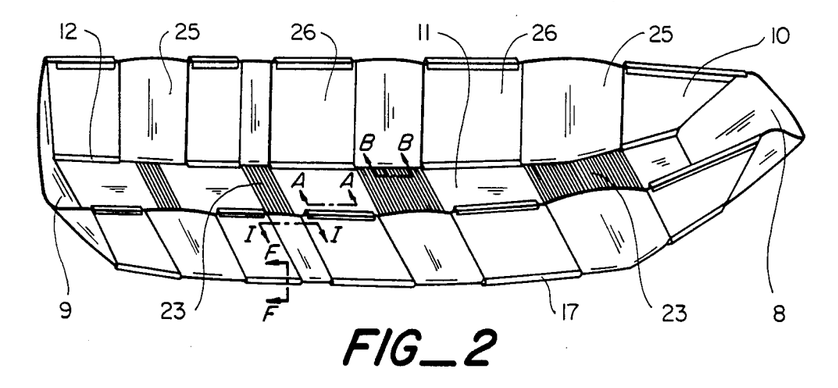
FIG. 2 is a perspective view of a disassembled seamless foldable boat with the far side folded up and the near side folded down.
Figure 3:
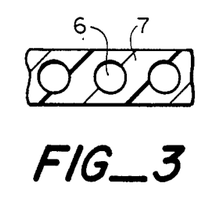
FIG. 3 is a sectional view taken along line A—A of FIG. 2 illustrating the foam cored structure.
Figure 4:
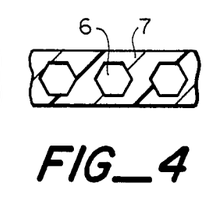
FIGS. 4–9 are illustrative sectional views of geometric variations of FIG. 3.
Figure 5:
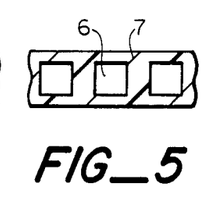
Figure 6:
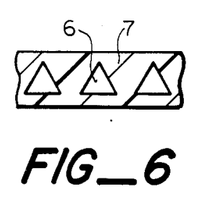
Figure 7:
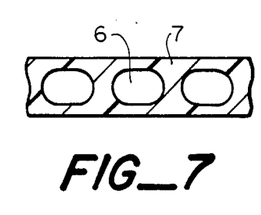
Figure 8:
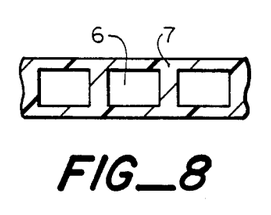
Figure 9:
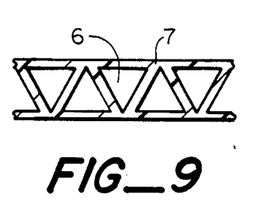

FIG. 2 depicts the seamless single piece hull without any of the subassemblies. The one piece hull is cast in a single mold from a plastic or elastomeric material. With reference to FIG. 3, the foam core construction is made from a foam core 6 that is surrounded by elastomeric or plastic material 7. It should be noted that the invention is not limited to the specific geometric design set forth in FIG. 3, but may employ the various geometric designs illustrated in FIGS. 4–9. Increased rigidity of the hull is provided by a reinforcing material embedded in the plastic or elastomeric, such as fiberglass or Kevlar. The foam core 6 provides buoyancy so that the Coast Guard's certification laws are satisfied. The foam core increases the area moment of inertia of the structure with minimum additional weight, thereby resulting in a very rigid design per pound of structure. The foam core design also allows the same material to be used in different areas of the boat at the same stress level, for different functions requiring magnitudes of difference in rigidity. By incorporating a foam core in specific areas of the boat, the local rigidity is greatly enhanced, while in other areas the foam is eliminated and the area moment of inertia is reduced so that the local rigidity is greatly reduced as desired. Therefore, the foam core construction allows specific tailoring of local rigidity and stress throughout the boat in order to maximize operational stiffness and to minimize folding resistance.

As shown in FIG. 1, intrinsically hinged bottom areas 23 form integral parts of the one piece hull design. The hinged areas are connected on two sides to the foam core bottom and connected on the other two sides to the side membranes to be described hereinafter. The hinged bottom areas 23 allow the bottom to fold relatively easy in one direction, and offer significant resistance to bending in an opposing direction than the fold. In addition, the hinged bottom areas seal the boat from the water below the boat. When assembled, the sides of the boat and/or the water pressure from below the boat prevent the bottom from folding downward.

Figure 13:
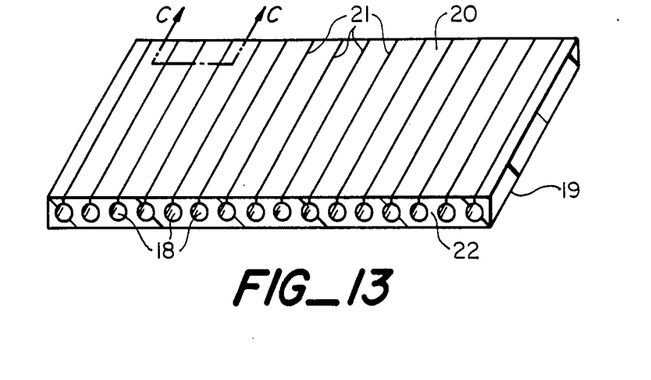
FIG. 13 is a perspective view of a section taken from lines B—B of FIG. 2 which illustrates the intrinsically hinged bottom structure.

As depicted in FIG. 13, the intrinsically hinged bottom areas have parallel cavities of circular cross-section 18 that run transversely to the length of each bottom area. Each hinged bottom area 23 has a continuous surface 19, an opposing surface 20 which is segmented by slits or notches 21 that are coextensive with the length of the grooves or apertures 18, and struts or internal walls 22 that adjoin the two opposing surfaces 19 and 20.

The intrinsically hinged structural member 23 is able to bend, roll, and fold in one direction while exhibiting high resistance to bending in the opposite direction. This ability is due to the different area moments of inertia of the two opposing directions. When the member 23 bends in a direction so that the slits or notches 21 open, the continuous surface 19 resists bending thereby yielding a relatively small area moment of inertia. When the member 23 bends in the opposite direction so that the slits in effect abut each other, thus loading the slit side 20 in compression and loading the continuous surface 19 in tension, the member yields a relatively large area moment of inertia. For example, an 0.6 inch thick intrinsically hinged structural member having 0.08 inch thick outside walls on both the continuous surface and the segmented surface has more than 200 times the area moment of inertia in one direction than in the opposite direction. In theory, this equates to more than 200 times the stiffness in one direction compared to the opposite direction, assuming that the tensile and compressive moduli of the constructing material are equivalent. This directional stiffness ratio is independent of the material used to construct the hinged member.

Figure 14:
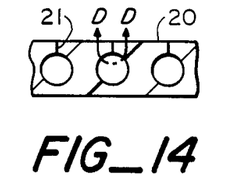
FIG. 14 is an enlarged sectional view taken along lines C—C of FIG. 13.
Figure 15:
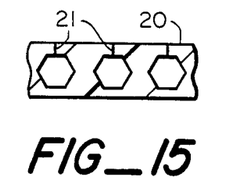
FIGS. 15 through 22 are illustrative sectional views of geometric variations of FIG. 14.
Figure 16:
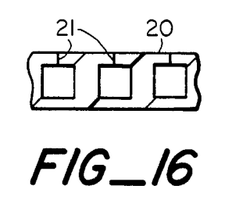
Figure 17:
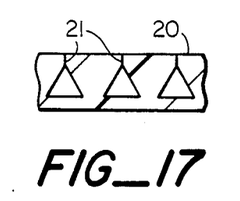
Figure 18:
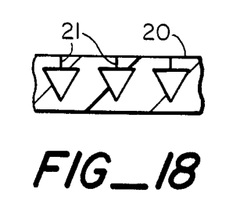
Figure 19:
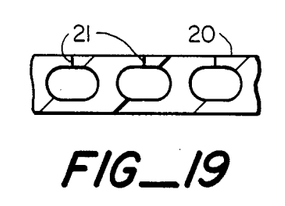
Figure 20:
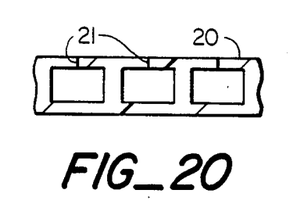
Figure 21:
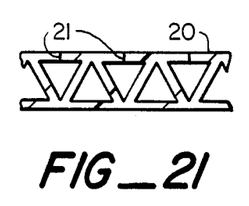
Figure 22:
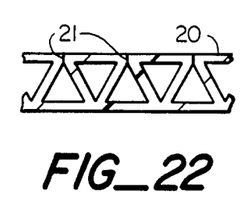

FIG. 14 represents a section of the hinged member shown in FIG. 13, whereas FIGS. 15–22 illustrate different geometric variations that may be used in accordance with this invention or construction of the hinged member 23. In each of the FIGS. 14–22 slits are provided at the upper surface corresponding to the surface 20 in FIG. 13.

Figure 23:
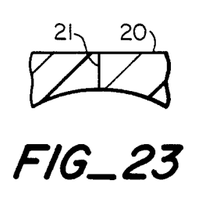
FIG. 23 is an enlarged sectional view of the portion between lines D—D of FIG. 14.
Figure 24:
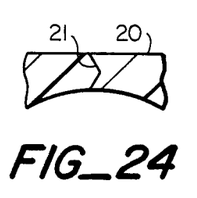
FIGS. 24 through 29 are views of alternative embodiments to the embodiment of FIG. 23.
Figure 25:
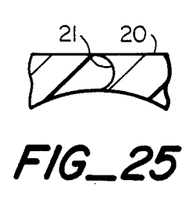
Figure 26:
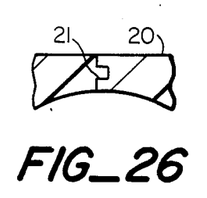
Figure 27:
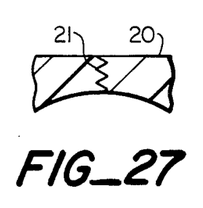
Figure 28:
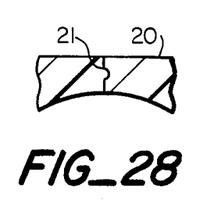
Figure 29:
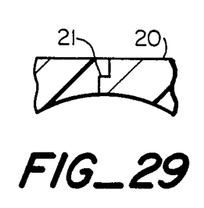
Figure 30:
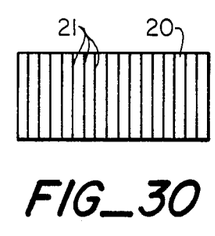
FIG. 30 is a plan view of the intrinsically hinged bottom structure shown in FIG. 13.
Figure 31:
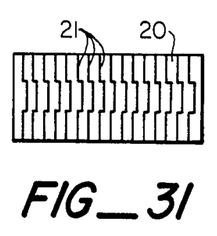
FIGS. 31 through 34 are plan views of alternate embodiments to the embodiment shown in FIG. 30.
Figure 32:
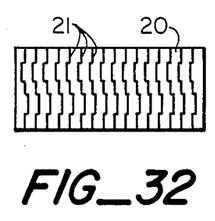
Figure 33:
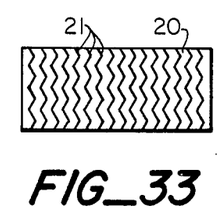
Figure 34:
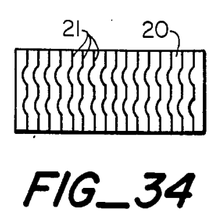
Figure 35:
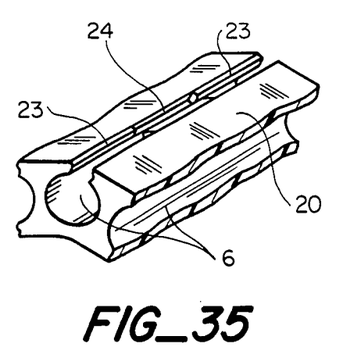
FIG. 35 is a perspective view of an intrinsically hinged structural member including periodic alternation of the multi-planar faces.

FIG. 23 defines a simplified slit design which is shown in FIGS. 13–22. FIGS. 24–29 are alternative geometric designs of slits or notches that may be used with the intrinsically hinged structural member 23 to inhibit buckling or shear failure of the segmented surface 20. With reference to FIG. 30, a parallel segmentation formed by grooves or notches 21 is depicted. This is the simplest and least expensive design for use with the hinged structural member. However, in some cases where additional torsional stiffness is required, selected ones of the configurations shown in FIGS. 31–34 are used for increasing torsional stiffness by minimizing relative motion between adjacent segments when subjected to torsional loads. Alternatively, if increased torsional stiffness is required in addition to notches to inhibit the buckling/shear out failure, both functions can be accomplished by simply switching the male side 23 and the female side 24 of the notches along a given boundary between two adjacent segments as shown in FIG. 35.

Figure 11:
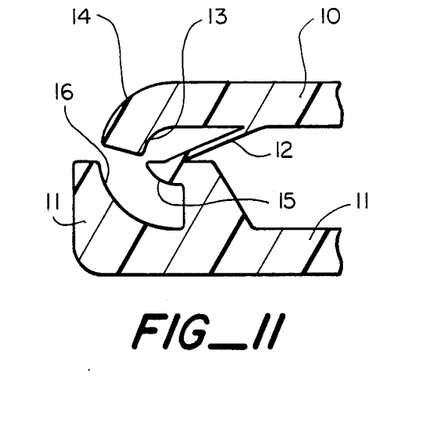
FIG. 11 is a sectional view taken along line F—F of FIG. 2 of the side-to-bottom hinge when folded for stowage.
Figure 12:
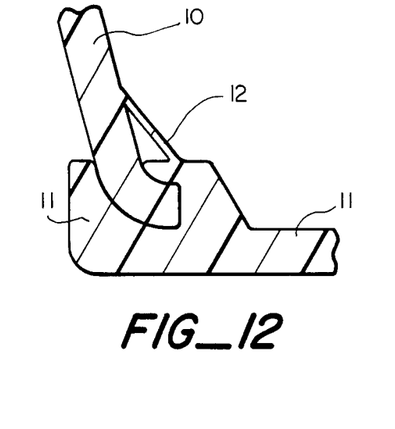
FIG. 12 is a sectional view taken along line G—G of FIG. 1 of the side-to-bottom hinge when fully assembled.

FIGS. 11 and 12 illustrate the side-to-bottom hinge folded and assembled respectively. The side-to-bottom hinge, when folded, connects the side of the boat 10 to the bottom of the boat 11 by means of a thin membrane 12, which provides minimal folding resistance. When fully assembled, the side of the boat 10 interlocks with the bottom of the boat 11 forming a structure that is highly resistant to lateral loads in both directions as clearly seen in FIG. 12. When the boat is fully assembled only one path exists in which the side 10 can move relative to the bottom 11 with minimum effort. Since this path is not available during boat operation, the assembled side-to-bottom hinge is extremely rigid due to the large area moment of inertia. When the boat is fully assembled, the membrane 12 bears load by being taut. Alternatively the membrane 12 is made by casting in additional material so that it takes no operational loads.

In accordance with the novel design, the lateral loads are negated while providing minimal resistance to folding by means of the four curved surfaces 13, 14, 15 and 16 of the assembly shown in FIG. 11. These four curved surfaces have the same effective center of curvature so that when the hinge is partially or fully engaged, minimal side clearance exists whereby maximum lateral stiffness is provided. Also only one path is available for the side 10, to move relative to the bottom 11 with minimal resistance.

Figure 10:
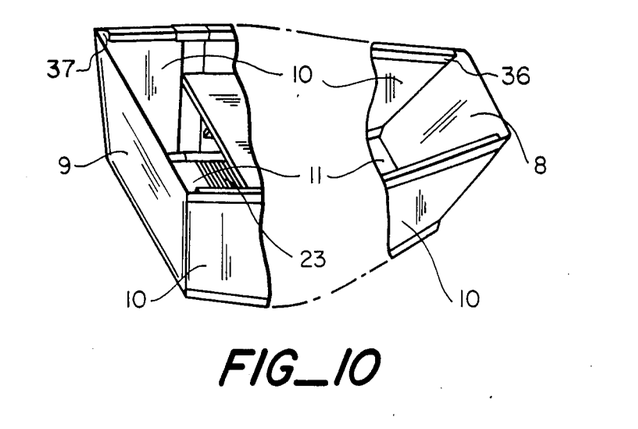
FIG. 10 is an enlarged view, partly broken away, of the bow and stern membranes of FIG. 1.

The boat structure includes a bow membrane 8 and a stern membrane 9 that form integral parts of the seamless single piece hull, as illustrated in FIG. 10. The membranes, which are constructed from relatively thin sheets of plastic or elastomeric material, are connected to the sides of the hull 10 and to the bottom of the boat 11. The membranes are preferably reinforced with Kevlar, fiberglass or other reinforcing material to increase their tensile strength and moduli. The membranes 8 and 9 seal the interior of the boat from the water and act as tension members to aid in keeping the sides of the boat from folding out. In addition, the thin cross-sections of the membranes provide a low area moment of inertia that is flexible and allows the sides of the boat to fold into the bottom of the boat with minimal resistance.

Figure 36:
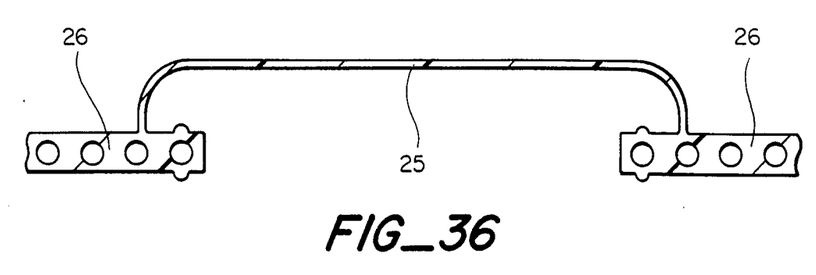
FIG. 36 is a sectional view of the side membrane taken along line I—I of FIG. 2.
Figure 37:
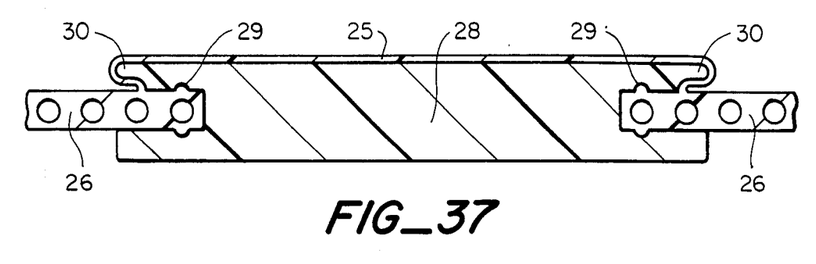
FIG. 37 is a sectional view of a side membrane with a side board inserted taken along line H—H of FIG. 1.

The boat is constructed with side membranes 25, shown in FIG. 1, which are integral parts of the one piece hull design. The side membranes are connected to the foam cored sides of the boat 26 on two sides and connected to the intrinsically hinged bottom 23. A sectional view of a side membrane 25 adjoining the foam cored side 26 is illustrated in FIGS. 36 and 37. The side membranes seal the boat from water, and allow the boat to fold transversely to its length, after the sides of the boat have been folded down against the bottom. The cross-section of the membrane 25 is made very thin to minimize the force required to fold the boat transversely to its length. The length of the side membranes 25 is made to be greater than the length of the adjoining intrinsically hinged bottom, thereby allowing the boat to be folded transversely to its length with the sides folded down and connected to the bottom.

Figure 38:
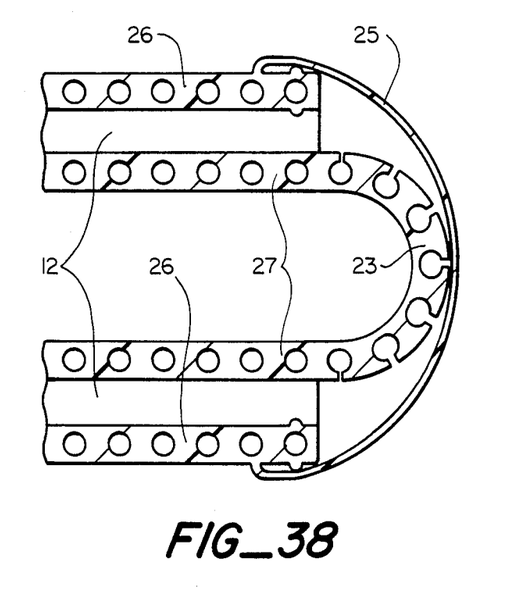
FIG. 38 is a sectional view of a transverse fold of the boat employing the side membrane and the intrinsically hinged bottom structure.

In FIG. 38, a sectional view of a transverse fold of the boat is illustrated. Two adjacent folded down foam cored sides of the boat 26 that are connected to the foam cored bottom 27 through the side-to-bottom hinge membrane 12 are folded so that they are parallel. The foam cored bottom section 27 folds where the intrinsically hinged bottom 23 separates the two adjacent foam cored bottom sections 27. The side sections 26 fold where the side membrane 25 separates the two adjacent foam cored side segments 26. The side membrane 25 is made of such length that allows it to wrap around the intrinsically hinged bottom 23 which has a smaller radius of curvature.

As described before, the boat includes bow and stern boards 2 and 3 respectively as well as side boards 28. Tracks 36 formed between the edge of the sides 10 of the hull and the membrane 8 and track 37 formed between edge of the side 10 and the membrane 9 are provided to engage the bow board and stern board so that the sides of the boat are prevented from folding inwardly or outwardly. The boards enhance the torsional rigidity of the boat by minimizing shear deformation. When the boards are inserted into their respective tracks, the bow and stern membranes are pulled over their respective boards as shown at 38, 39, respectively, FIG. 1 and secured to prevent the boards from migrating along the tracks when operational loads are counteracted. In this way, the bow and stern membranes and the bow and stern boards cooperate to prevent the sides of the boat from bending outward or inward.

With reference to FIG. 37, the side boards 28 are moved down along the edges of two adjacent foam cored side segments 26 and rigidly interlock the two segments near the interlocking projections 29. The side boards interlock the adjoining side segments to enhance the overall rigidity of the boat, and act as side supports for seats which are provided. In addition, the side boards serve to remove excess slack in the side membranes by doubling part of the material over the two side board projections or profiles 30.

Figure 39:
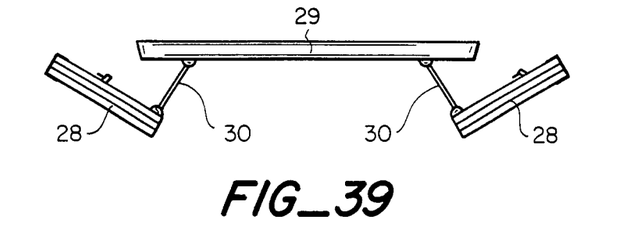
FIG. 39 illustrates the seat subassembly.

As depicted in FIG. 39, a seat assembly comprising two side boards 28, a cross board 29 and two links 30 are provided. The seat assembly forms a rigid truss structure that contributes to the overall rigidity of the boat. The angle between the cross board 29 and the side board 28 is the same as the flare angle of the boat's side, when the boat is fully assembled. The seats are permanently linked to their respective side boards to form articulated assemblies.

Figure 40:
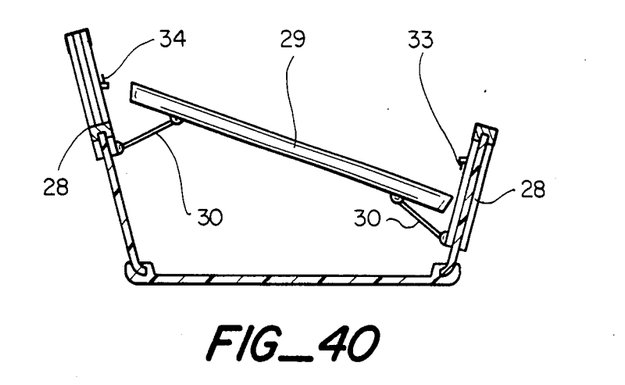
FIGS. 40 and 41 are illustrative sectional views of the seat subassembly used with the one piece hull assembly.

The design of the seat assembly minimizes the number of steps required to assemble the seats into the boat. During assembly, the right side board 28 is connected to the boat first, as shown in FIG. 40. The left side board of the assembly is then slid into place. As the left side of the seat is slid down into its track, the right side of the cross member 29 butts up against the pinned bracket 33, and the left side of the cross members butts down against the pinned bracket 34, as delineated in FIGS. 40 and 41. After both side boards are slid all the way down, an optional latch on one side of the assembly is used to provide extra security.

Figure 41:
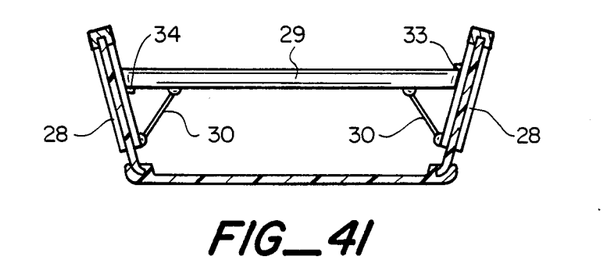

When assembled, the seats prevent the side of the boat from simultaneously moving up and over, thereby precluding any relative motion required for folding the boat. The side-to-bottom hinge precludes any operational loads from sliding the left side of the seat up and out along the only path that could initiate the disassembly process of the seat subassembly.

Figure 42:
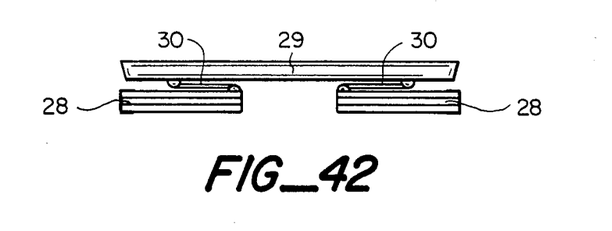
FIG. 42 shows the seat subassembly folded up for stowage.

When the seat subassembly is separated from the one piece hull, the design of the seat assembly allows the side boards 28 to pivot under the cross member 29 via the links 30 so that the folded volume fits in a width that is less than or equal to the width of the cross member 29. The design makes assembly and disassembly easy, and minimizes the number of pieces and the stowage volume.

As seen in FIG. 1, a railing is provided that comprises two interlocking structures, i.e., the hull bound railing structures 31 and the side board railing structures 32. The railing structures 31 are permanently attached to the foam cored sides 26 between the side membranes 25. The side board railing structures 32 are permanently attached to the side boards 28. The side board railings are wider than the side boards, so that when a side board is slid all the way down its tracks, the side board railing snaps over the hull bound railing to form an interlocking rigid railing structure.

Figure 43:
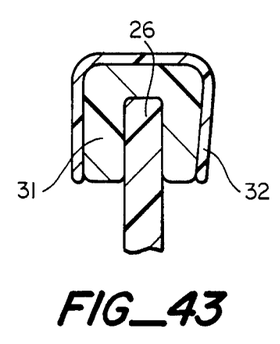
FIG. 43 is a sectional view taken from lines E—E of FIG. 1 illustrating the interlocking railing structures.

FIG. 43 illustrates a cross section of the foam cored side 26 with its hull bound railing 31 attached, and a side board railing 32 snapped over the hull bound railing 31. One side of the hull bound railing and one side of the side board railing are tapered. The tapered sides require a predetermined force to pull the side board bound railing up and over the hull bound railing. Thus operational loads do not cause migration of the side boards up and out of their tracks. As an alternative, latches can be provided to supplement or eliminate the interlocking force design.

There has been described herein a compact foldable yet rigid boat assembly which affords simple and rapid assembly and disassembly. The boat is formed from a low stress seamless one-piece hull, preferably from a foam cored elastomeric or plastic. When assembled, the boat is extremely rigid, has minimal weight and is effectively sealed against leakage.

What is claimed is:

1. A compact foldable boat comprising:
   a single piece hull having two opposing sides, a bottom and bow and stern section;
   membrane tension members connected to the sides and the bottom of said hull at the bow and stern for preventing the sides of said hull from folding out when said boat is assembled;
   said opposing sides including side membrane members integral to and between side panels and connected to the bottom to allow transverse folding of the boat the bottom of said boat including bottom panels and intrinsically hinged bottom panels between said bottom panels;
   a side-to-bottom hinge member connected to each of the side panels and bottom panels of the boat for providing resistance to folding and bending of said boat when said boat is assembled; and
   intrinsically hinged bottom panels connected between the bottom panels and to said side membrane members for providing bending stiffness to said boat when said boat is assembled.

2. A compact foldable boad as in claim 1, wherein said hull is seamles.

3. A compact foldable boat as in claim 1, wherein said hull is made from a foam cored elastomeric or plastic material.

4. A compact foldable boat as in claim 1, including a bow board and a stern board disposed within tracks formed in said hull for keeping the sides of the boat from folding inward or outward and for providing torsional rigidity.

5. A compact folding boat as in claim 4, wherein a bow board and a stern board disposed within tracks are retained via respective bow and stern membranes which pull over the top of said bow and stern boards.

6. A compact foldable boat as in claim 1, including side boards for rigidly interlocking the sides of said boat to provide rigidity to said boat.

7. A compact foldable boat as in claim 6, including a seat assembly comprising said two side boards, a cross board and link members positioned in tracks formed in the sides of said boat.

8. A compact foldable boat as in claim 7, including pinned brackets for positioning said seat assembly side boards.

9. A compact foldable boat as in claim 8, wherein one of the pinned brackets is oriented upwards relative to one assembled side board and the other pinned bracket of the assembly is oriented downward relative to another assembled side board.

10. A compact folding boat as in claim 7, wherein said side boards have parallel projections to take up excess slack of side membranes when assembled.

11. A compact foldable boat as in claim 1, wherein said hinged bottom has a multiplicity of slits or notches formed on one surface.

12. A compact foldable boat as in claim 1, including interlocking railing structures attached to said side boards and to said boat sides between said membrane members for preventing movement of said side boards when the boat is assembled and for increasing overall boat rigidity.

13. A compact foldable boat as in claim 1, wherein said side-to-bottom hinge member is formed with a cavity and an interlocking protrusion.

14. A compact folding boat as in claim 13, wherein said cavity and interlocking protrusion are integrally connected via a membrane.

15. A compact folding boat as in claim 13, wherein said cavity and interlocking protrusion are longitudinal and parallel to said sides of said boat.

16. A compact foldable boat as in claim 13, wherein said cavity and interlocking protrusion have interfacing surfaces which have a common center of curvature when fully assembled.

17. A compact foldable boat as in claim 1, wherein said hinged bottom means is formed with a multiplicity of cavities.

18. A compact foldable boat as in claim 17, wherein said cavities are longitudinal and parallel and are formed transverse to the length of said hinged bottom means.

19. A compact foldable boat as in claim 17, wherein said cavities are circular, oval, rectangular, triangular, or multi-sided.

20. A compact foldable boat as in claim 1, wherein said side membrane has excess length in its assembled position to allow transverse folding of said boat when disassembled.

21. A compact foldable boat comprising:
a single piece hull having two opposing sides, a bottom and bow and stern section;
bow and stern membrane tension members connected to the sides and the bottom of said hull for preventing the sides of said hull from folding out when said boat is assembled;
side membrane members integral to the sides and between side panels and connected to the bottom to allow transverse folding of the boat;
side boards positioned in tracks on each of said opposing sides for rigidly interlocking the sides to provide rigidity;
at least one seat assembly comprising side boards on opposing sides, a cross board and link members, said seat assembly positioned in said tracks formed in the side of said boat, one side of each of said link members connected to a common cross board via hinges, and the other side of the link members connected to respective side boards via hinges for aiding in assembling the seat assemblies to the one-piece hull and for forming one link in the assembled seat assembly truss structure;
a side-to-bottom hinge member connected to the side panels and bottom panels of the boat for providing resistance to folding and bending of said boat when said boat is assembled; and
intrinsically hinged bottom panels connected between the bottom panels and to said side membrane members for providing bending stiffness to said boat when said boat is assembled.

* * * * *